July 8, 1941.  W. OWEN  2,248,719
SEALING MEANS FOR THE EDGES OF SWINGING DOORS
Filed Feb. 6, 1940  7 Sheets-Sheet 3

INVENTOR
WILLIAM OWEN
BY Olew E Bee
ATTORNEY

July 8, 1941. W. OWEN 2,248,719
SEALING MEANS FOR THE EDGES OF SWINGING DOORS
Filed Feb. 6, 1940 7 Sheets-Sheet 4
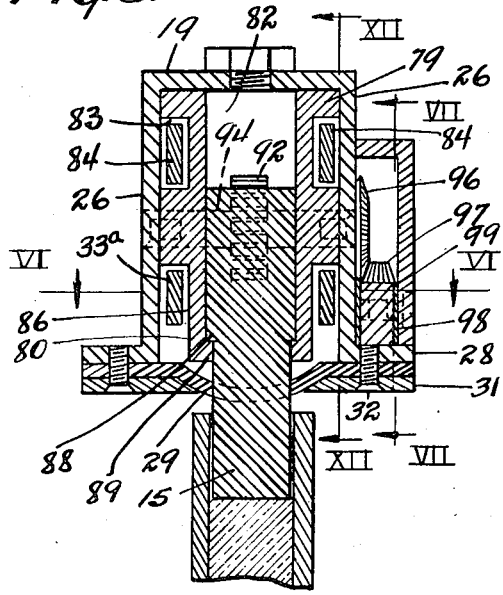
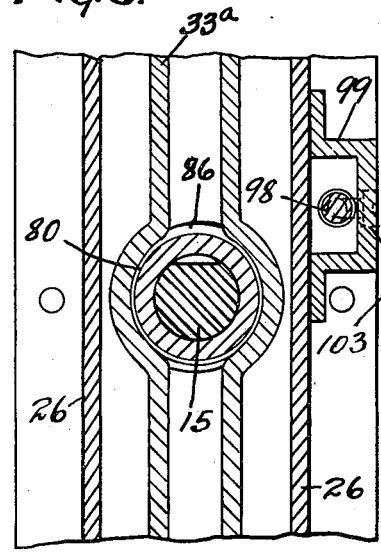
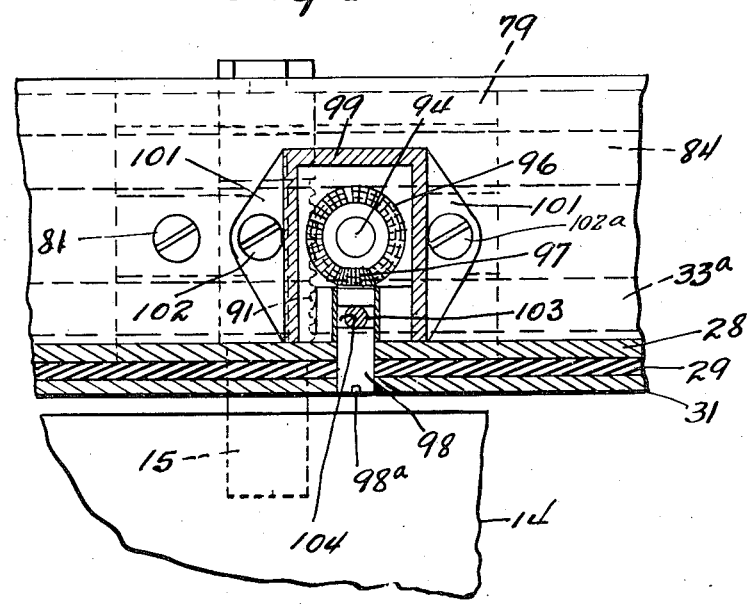
INVENTOR
WILLIAM OWEN
BY
ATTORNEY

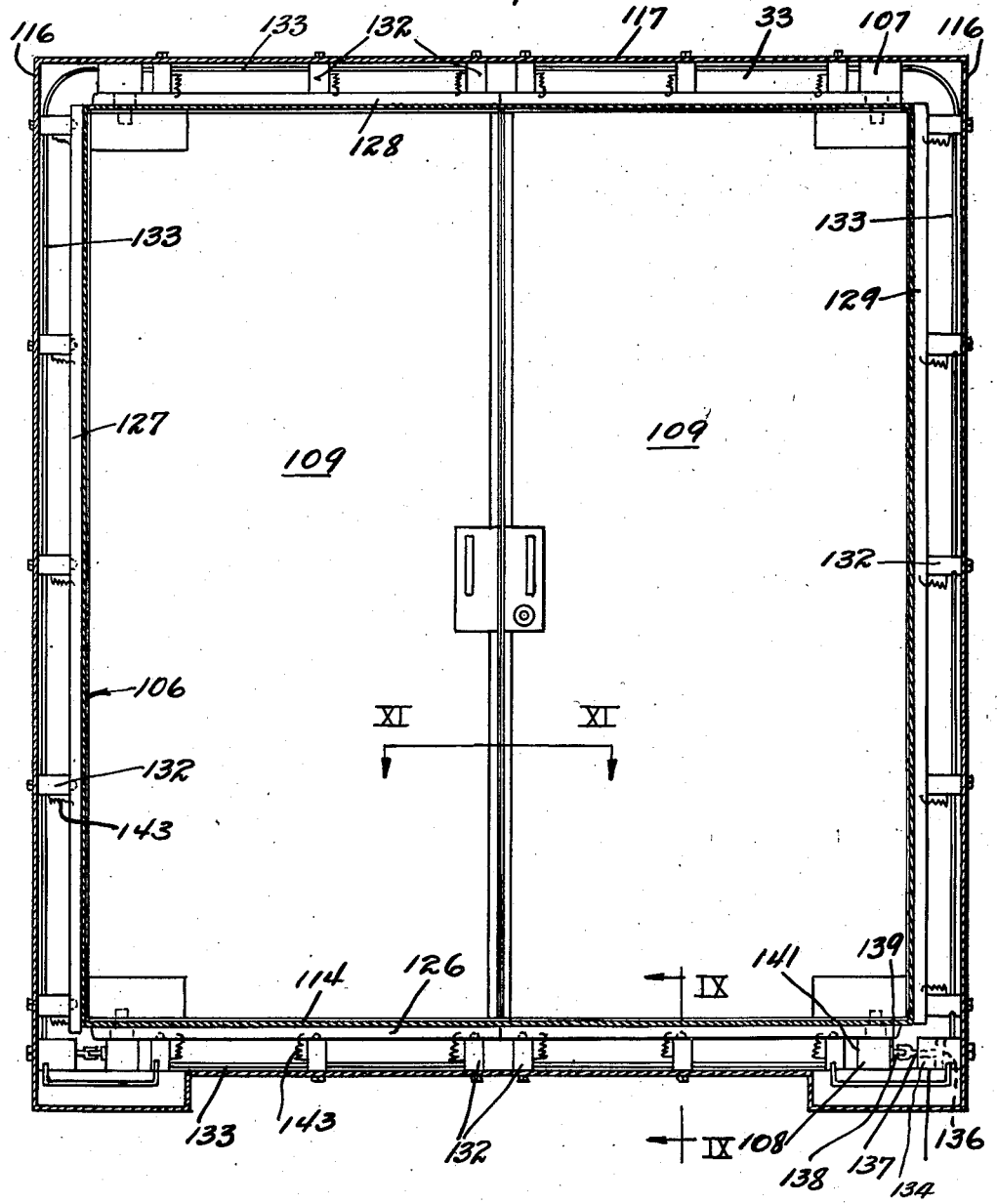

July 8, 1941.   W. OWEN   2,248,719
SEALING MEANS FOR THE EDGES OF SWINGING DOORS
Filed Feb. 6, 1940   7 Sheets-Sheet 6

INVENTOR
WILLIAM OWEN
BY
Olew E. Bee
ATTORNEY

July 8, 1941. W. OWEN 2,248,719
SEALING MEANS FOR THE EDGES OF SWINGING DOORS
Filed Feb. 6, 1940 7 Sheets-Sheet 7

INVENTOR
WILLIAM OWEN
BY
Olew E. Bee
ATTORNEY.

Patented July 8, 1941

2,248,719

UNITED STATES PATENT OFFICE 2,248,719

SEALING MEANS FOR THE EDGES OF SWINGING DOORS

William Owen, Pittsburgh, Pa., assignor to Pittsburgh Plate Glass Company, Allegheny County, Pa., a corporation of Pennsylvania Application February 6, 1940, Serial No. 317,516

5 Claims. (Cl. 20—68)

The present invention relates to the provision of seals about the edges of conventional swinging doors and particularly to the provision of a seal applicable to use with doors consisting essentially of a swinging panel of tempered glass.

One object of the invention is to provide a sealing means adapted to engage the edge of a door while the latter is in closed position, but being adapted to be retracted to leave the edges free from contact just prior to or upon initiation of swinging movement to open the door.

This and other objects of the invention will be apparent from consideration of the following specification and the appended claims.

In a swinging door construction and particularly in a construction involving a massive panel of tempered glass it is desirable that the edges of the panel during opening or closing movements be entirely free from all contacts. Obviously any contact of the door with the frame thereof or with the floor adjacent to the door impedes movement of the door and is also likely to cause abrasion of the edges of the door or the structure with which it contacts. In order to prevent any contact of the edges of the door with the adjacent structure adequate clearance must be provided. On the other hand clearance is objectionable because it permits excessive flow of air about the edges of the door.

In accordance with the provision of the present invention a seal is effected between the edge of the door and adjacent the door frame by provision of a sealing element adapted to be projected into engagement with the edge of the door when the latter is closed, but being retracted just prior to or immediately after initiation of movement of the door to open it.

For a better understanding of the invention reference may now be had to the accompanying drawings in which Figure 1 is a fragmentary cross-sectional view of a portion of a building wall in which is disposed a door embodying a form of the invention.

Figure 5 is a fragmentary cross-sectional view taken substantially upon the line V—V of Figure 1 and showing in detail the construction of the upper pintle of the door.

Figure 6 is a fragmentary cross-sectional view taken substantially upon the line VI—VI of Figure 5.

Figure 7 is a fragmentary cross-sectional view taken substantially upon the line VII—VII of Figure 5.

Figure 8 is a cross-sectional view of a modified form of door structure.

In the drawings like numerals refer to like parts throughout.

Figure 1:
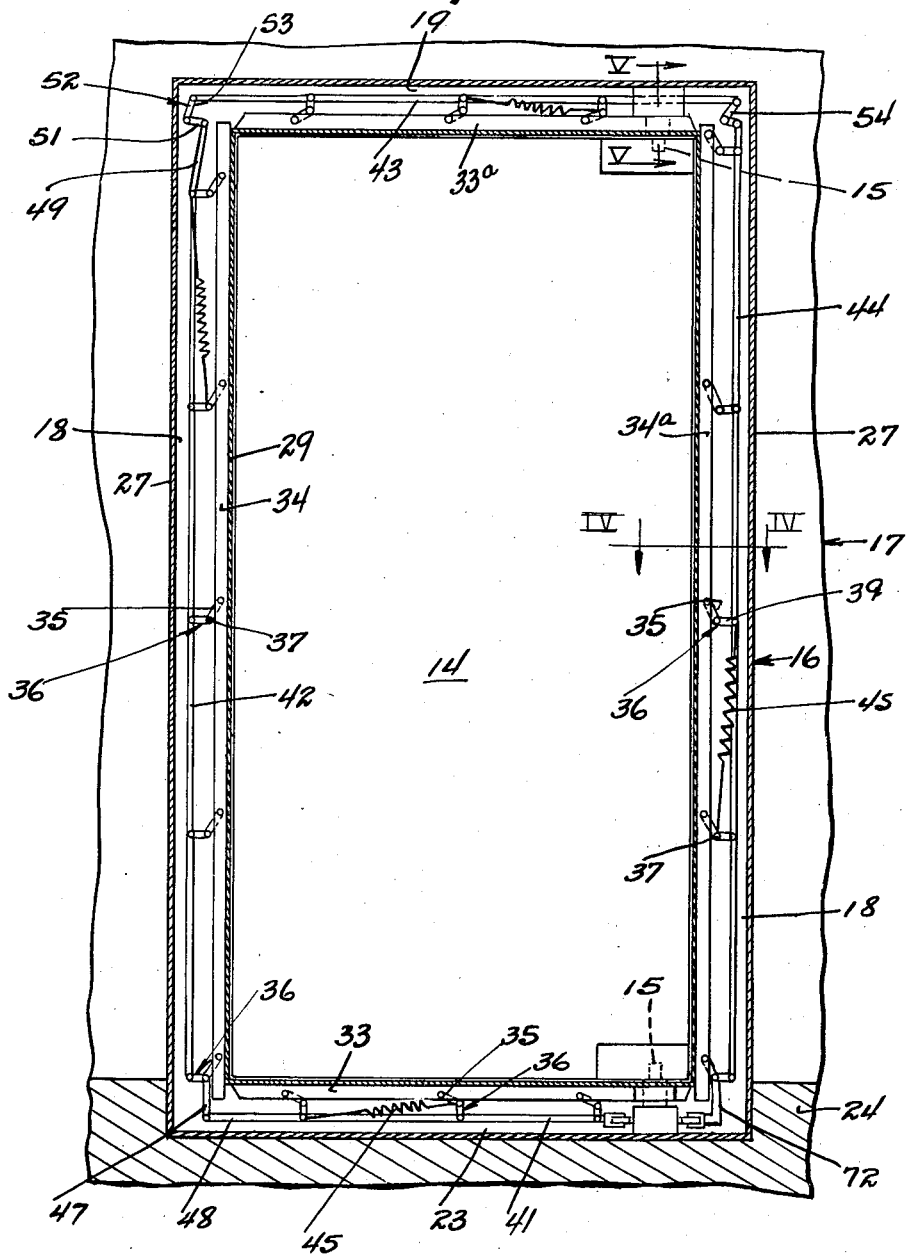
Figure 4:
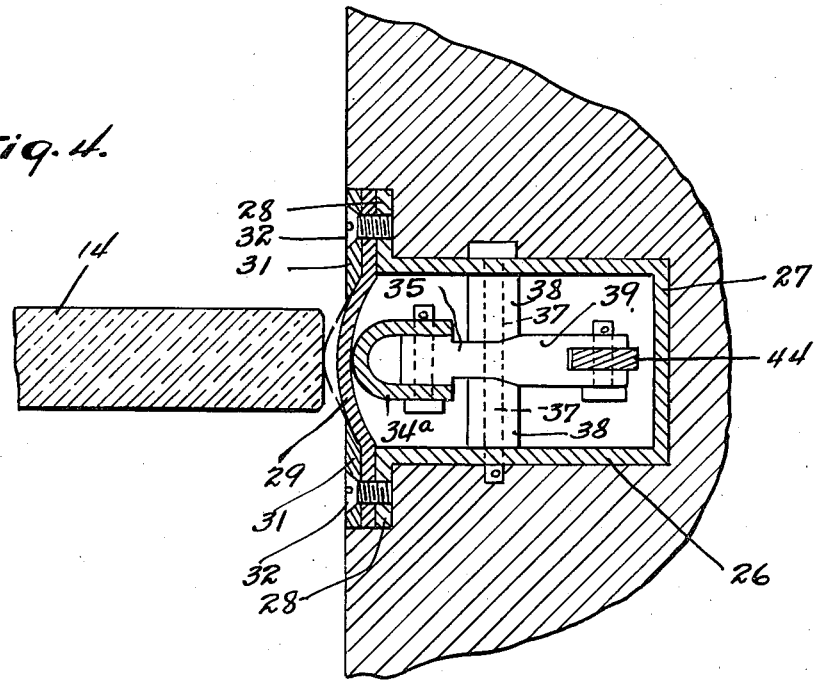
Figure 4 is a fragmentary cross-sectional view taken substantially upon the line IV—IV of Figure 1.
Figure 12:
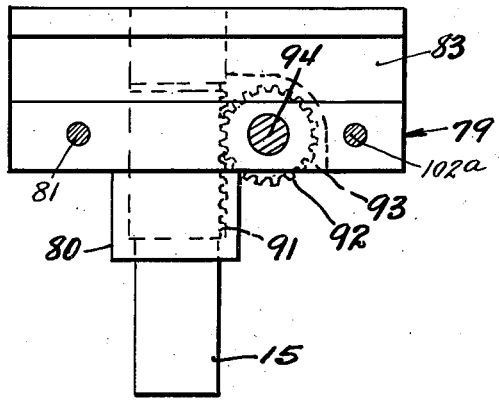
Figure 12 is a cross-sectional view taken substantially upon the line XII—XII of Figure 5.

The form of the invention shown in Figures 1 to 7 inclusive and in Figure 12 comprises one or a plurality of door panels 14 disposed to swing on pintles 15 in a suitable frame 16, which is mounted in a building wall 17, and which includes jamb sections 18, lintel section 19 and bottom portion or sill 23 disposed in a floor 24. The frame is of channel-like construction including as shown in Figures 1 and 4 side walls 26 and a connecting web 27 constituting the bottom of the channel. The side walls may also be provided with marginal flanges 28, which may be countersunk into rabbeted portions in the wall or floor in which the frame is disposed. The channel is closed by a flexible sealing strip 29, preferably of rubber or other yieldable but elastic material, which may be clamped in position upon the flanges 28 by means of clamping bars 31 held in position by screws 32.

Within the channel of the frame is disposed mechanism to project the strip 29 into engagement with the edge portions of the door 14 when the latter is closed. In the form of the invention shown in Figure 1 this mechanism includes lower and upper horizontal bars 33 and 33a and vertical bars 34 and 34a, which as shown in Figure 4 may be of U cross-section and being adapted to engage the inner face of the strip 29. The bars are pivotally supported on the extremities of arms 35 of bell-crank levers 36, the bell-cranks at their apices being journaled upon bolts 37, extending through the side walls 26 of the channels. The levers may be maintained in centered position within the channels by means of sleeves 38, a section of which is disposed upon bolt 37 upon each side of each of the levers. The second arm 39 of each lever at its lower extremity is pivoted to one of the connecting links 41, 42, 43 and 44 and are adapted to actuate all of the bell-crank levers in synchronism and thus to project the bars 33, 33a and 34, 34a uniformly toward the door. Tension springs 45, each of which is connected across from one of the levers 36 adjacent to its pivotal connection with the corresponding link or rod 41, 42, 43 or 44, to an adjacent lever at its apex, provides means for retracting the bars 33, 34, 33a and 34a.

For purposes of interconnecting the vertical bar 34 with the lower horizontal bar 33, the lower of the levers 36 supporting bar 34 is provided with a third arm 47 rigidly affixed thereto. The extremity of this arm is pivoted to link 48, which in turn is pivoted to the adjacent extremity of the bell-crank on bar 33. The upper extremity of rod 42 is provided with link 49 connecting it to the extremity of arm 51 of bell-crank lever 52, which is appropriately pivoted at its apex to jamb 19 and is pivotally connected at the extremity of its second arm 53 to rod 43. The opposite extremity of rod 43 may also be interconnected by bell-crank lever 54 to rod 44.

Figure 2:
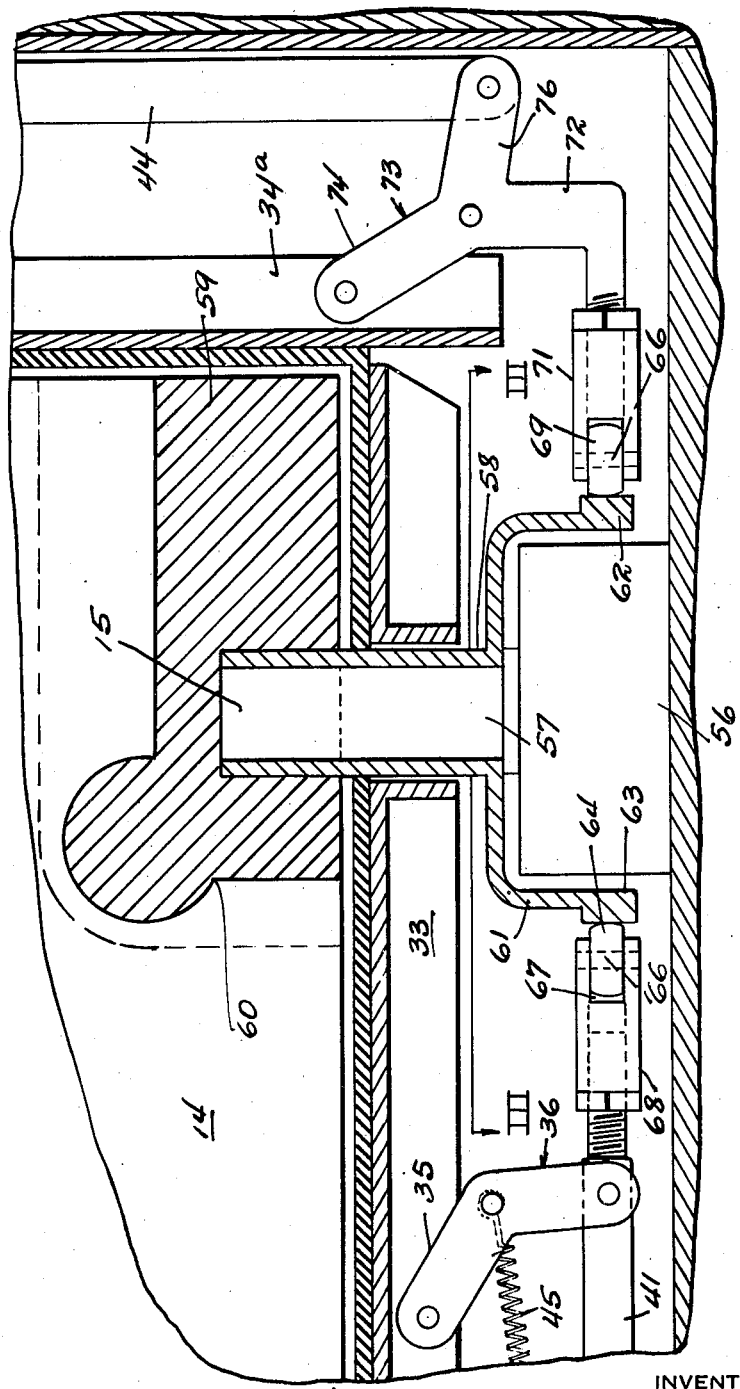
Figure 2 is a fragmentary detail view of one of the door pintles and the attendant mechanism for actuating the sealing element toward the door edge.
Figure 3:
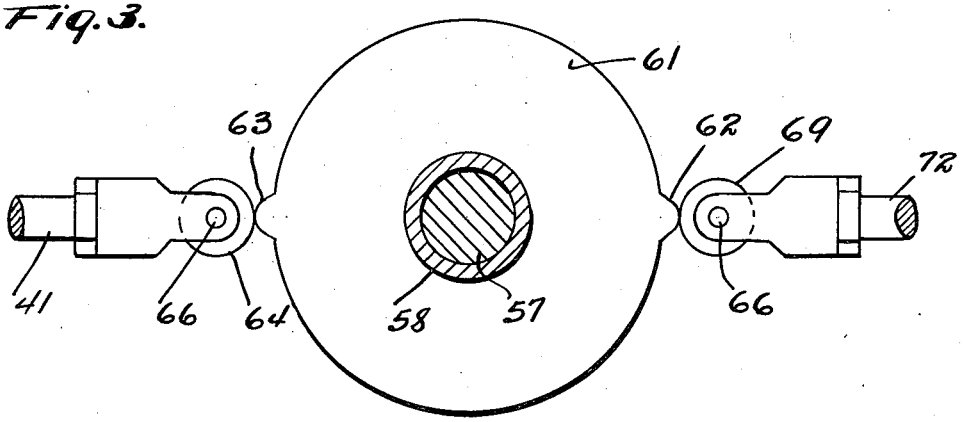
Figure 3 is a fragmentary sectional view taken substantially upon the line III—III of Figure 2.

The lower pintle, as best shown in Figure 2, is integral with a shaft 57 which is connected in any convenient manner to a door check mechanism (not shown), of conventional design. The pintle 15 is keyed within a sleeve 58, that in turn is keyed within a block or casting 59 suitably clamped in a notch 60 in the lower corner of the door panel 14. Since this construction is not a part of the present invention it is not described in detail. Sleeve 58 at its lower extremity is unitary with a skirt 61 having cam-like bosses 62 and 63 adapted to engage, when the door panel 14 is in closed position, with a roller 64. The roller has a bearing upon a pin 66 disposed transversely within a slot 67 in bifurcated member 68, threaded upon the adjacent end of the connecting link 41.

It will be apparent that in this construction when the door 14 approaches closed position the cam 63 engages roller 64, thus actuating the rod 41 to project the bars 33 and 34 outwardly to engage the sealing strip at the edges of the door panel.

Cam 62 also engages follower roller 69 disposed in bifurcated head 71, which projects laterally from the lower extremity of an arm 72 upon bell-crank lever 73. Arms 74 and 76 of the latter are respectively pivoted to the lower extremities of levers 34a and 44.

The operation of the construction is practically self-evident. Assuming that door 14 is closed, the follower rollers 64 and 69 will be engaged by cams 63 and 62 to urge rods 41 and 44 against the pull of springs 45. The bars 33, 33a, 34 and 34a upon levers 36 will thus be urged against diaphragm 29, thus pressing the latter against the edge of the door panel and providing an effective seal about the edges of the latter.

Assuming that it is desired to open the door the initial rotation of the spindle 15 with cams 62 and 63 will allow the rollers 64 and 69 to move inwardly toward skirt 61, to retract rods 41 and 44 and thus release the diaphragm 29 from contact with the edge of the door.

For purposes of facilitating the insertion or removal of the door panel 14 from the doorway, the upper of the pintles 15 is preferably of a construction adapted for retraction into the lintel 19. A suitable embodiment of such retractible pintle is illustrated in Figures 5, 6, 7 and 12. Preferably it includes a block 79 of cast iron or other metal and having a downwardly extending boss 80. The block is secured in position in the lintel 19 by means of screw 81, extending through the side wall portions 26 of the lintel and both the block 79 and boss 80 are bored as indicated at 82 to receive the reciprocable bolt 15.

Longitudinally-extending grooves 83, formed in the block, receives a siamesed or divided portion 84 of rod 43 upon each side of the block. The bar 33a engaging the diaphragm 29 along the upper edge of the door may also be siamesed or divided to provide an opening 86 to receive downwardly-projecting boss 80. As will be evident from Figure 5 the reciprocable pin 15 is provided with an intermediate shoulder 88 adapted to engage a flange 89, that acts as a limit stop at the lower extremity of the bore 82 of the block.

Mechanism for raising and lowering the pintle includes integrally formed rack teeth 91 engaging an actuating gear 92 (best shown in Figure 12), which gear is disposed within a slot 93 formed in the block 79. Gear 92 is carried upon shaft 94, which extends transversely through the side wall portions 26 of the lintel 19 and at one extremity is provided with a bevel gear 96. A second bevel gear 97 mates with gear 96 and is secured upon the upper extremity of a stud shaft 98 which extends upwardly through flange portion 28 of the lintel. At its lower extremity the shaft 98 may be provided with a slot 98a to receive a screw driver or other instrumentality by means of which it may be rotated to actuate gears 97, and thus to rotate gear 92, to raise or lower the pintle 15. The gears 96 and 97 may conveniently be enclosed by a small housing 99, having flanges 101 secured to the side wall 26 of the lintel by means of screws 102 and 102a. The latter is also threaded into block 79 to assist screw 81 in holding the latter in place. A set screw 103 may extend through the housing into a peripheral groove 104, formed in the shaft 98 for purposes of maintaining the latter in position in its bearing in the flange 28.

Figure 9:
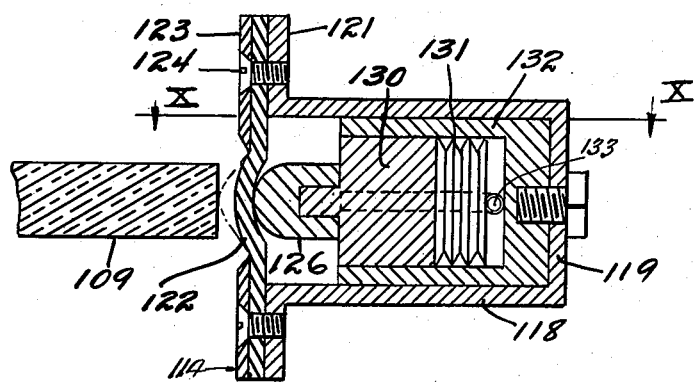
Figure 9 is a cross-sectional view taken upon the line IX—IX of Figure 8 and shows in detail a pneumatic device for operating the sealing mechanism shown in Figure 8.
Figure 10:
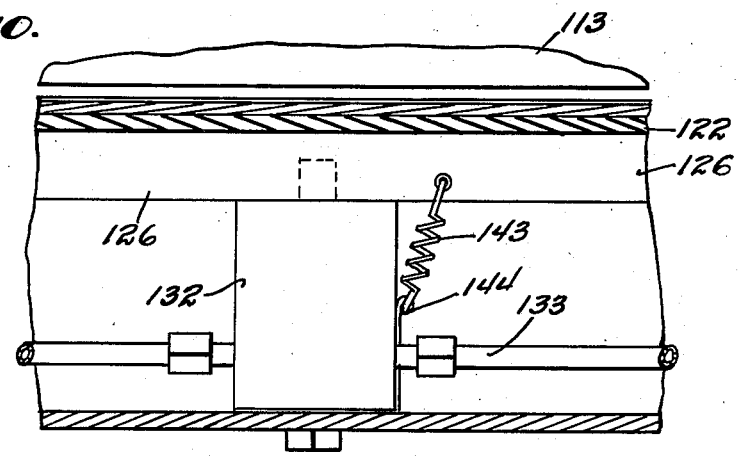
Figure 10 is a cross-sectional view taken substantially upon the line X—X of Figure 9.
Figure 11:
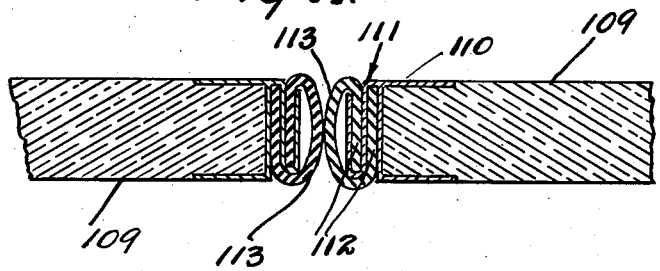
Figure 11 is a fragmentary cross-sectional view upon the line XI—XI of Figure 8, showing a suitable form of sealing strip for use between the edges of two adjacent swinging doors.

In Figures 8, 9, and 10, of the drawings, is illustrated the use of hydraulic pressure for actuating the weather strip into engagement with the door panel. In this construction a door frame 106 may be provided with upper pintle 107 and lower pintle 108 for a door panel 109. If desired, the panels may be in duplicate to provide double swinging doors. The mating edges of the panels may be provided with sealing strips comprising channels 110 that grip opposite sides of the panels and tongues 111, which are replicately bent to provide folds 112 for gripping the edges of flexible rubber strips 113, which, as shown in Fig. 11, meet in sealing contact.

The door frame includes sill portion 114, jamb sections 116 and a lintel section 117. These sections, as shown in Fig. 9, are channels essentially similar to those already described and include side wall portions 118 and bottom or web portions 119. They are, also, provided with flanges 121 with a flexible closure or diaphragm 122 secured thereupon by means of clamping plates 123 and securing screws 124.

Mechanism, for actuating the flexible closure 122 into engagement with the edges of the door, includes bars 126, 127, 128 and 129 engaging the member 122 throughout its length. These bars are supported upon the extremities of pistons 130 carried upon fluid-filled, pleated diaphragms 131 in cylinders 132, which cylinders in combination with the pistons constitute expansible and retractable pressure chambers and are conveniently secured within the frame sections 114, 116 and 117. Conduits 133 interconnect the cylinders with a pressure cylinder 134 within which reciprocates a piston 136 having an outwardly-extending piston rod 137, which rod is bifurcated to carry a roller 138. The roller engages a cam surface 139 upon a skirt 141, carried by lower door pintle 108 and corresponding to skirt 61.

The bars 126, 127, 128 and 129 are normally urged away from the flexible weather strip or closure 122, by means of tension springs 143, each of which is connected to one of the bars and at the other extremity is connected as shown in Fig. 10 to a suitable bracket 144 upon the side of one of the cylinders 132 or to any other convenient fixed element.

In this embodiment of the invention it will be apparent that when the doors are in closed position the piston rod 137 is actuated inwardly by the action of cam 139 upon roller 138 and thus causes pressure to be transmitted through conduits 133 to each of the cylinders 132. The pressure actuates the pistons 130 outwardly to force the strip or closure 122 against the edges of the door panels. Upon the initiation of motion to open the door panels the cam 139 is rotated to release the roller 139. The piston 137 is thus permitted to move outwardly, thereby releasing the fluid pressure in the system. The bars 126, 127, 128 and 129 are then retracted by the tension of the springs 143, thereby releasing the flexible closure or strip 122 from the edges of the door panels and leaving the latter free to swing.

Figure 13:
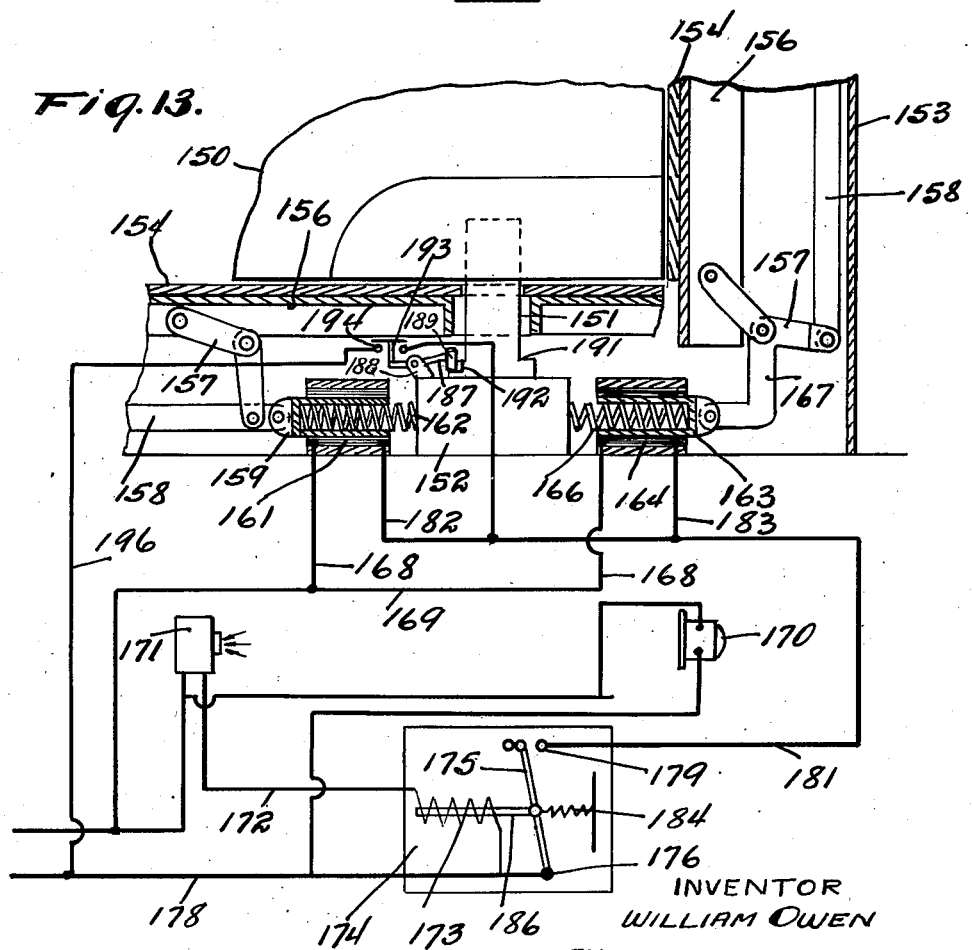
Figure 13 is a fragmentary sectional view of a third form of the invention.

As shown in Fig. 13, electrically operated means may be employed to actuate the weather strip for purposes of engaging it with or retracting it from the edges of the door panel. In this construction a door panel 150 corresponding to the panels 14 or 109 already described is mounted upon a pintle 151, which rotates with the panel and which has a bearing in a suitable housing 152. A channel frame 153 for the door may correspond essentially to the frames 16 and 106, already described, and may be closed by flexible element 154, adapted to be actuated outwardly by means of bars 156, engaging the back or rear surface thereof. These bars are supported upon bell-crank levers 157, essentially corresponding to the levers 36 already described. One end of each lever is connected to an actuating bar 158 essentially corresponding to one of the bars 41, 42, 43 and 44, shown in Fig. 1.

The lower of these bars is provided at one of its extremities with a magnetic plunger or armature 159, reciprocating in a solenoid 161, and receives one extremity of a helical spring 162, which at its opposite extremity bears upon the side of fixed housing 152. Similarly a second plunger 163, reciprocating in solenoid 164, may be disposed upon the opposite side of the housing and is also provided with a helical spring 166. The plunger is further pivotally connected to an arm 167 projecting downwardly from the lower end of the bell-crank lever 157, which supports the lower end of adjacent bar 156 for the jamb section of the door frame.

The solenoids are connected by branches 168 to one lead 169 of a power system. Any convenient means may be employed for controlling the energization thereof. For example, they may be connected in circuit with a conventional push button suitably disposed to be operated manually. However, in the embodiment of the invention as shown in the drawings, a photoelectric control is provided, designed to be operated by the cutting of a beam of light by prospective users of the doorway. In this construction a spot-light 170 or other source of illumination projects a beam of light across the doorway at a suitable distance from the latter. The beam normally impinges upon a photo-sensitive electrical cell 171 disposed upon the opposite side of the doorway. This cell is connected by conductor 172 in series with a coil 173 of relay mechanism 174. The relay is of conventional design and includes an arm 175 pivoted and indicated at 176 and being connected to a power line 178, which is also connected to coil 173. The arm is designed to make contact with point 179 of conductor 181 having branches 182 and 183 leading to the solenoids 161 and 164. The arm 175 is urged toward the contact point by a tension spring 184.

The arm 175 is also provided with a plunger or armature 186 pivotally connected thereto and projecting into the solenoid or coil 173. So long as the light strikes cell 171 coil 173 is energized and the plunger is retained in retracted position in the coil and thus maintains the relay in open position. When the beam of light is interrupted by the user of the door the coil or solenoid 173 is deenergized and the arm 175 under the urge of the spring 184 is caused to contact with point 179, thus closing the circuits of the solenoids 161 and 164 and causing the plungers or armatures 159 and 163 to be attracted by magnetic urge into the solenoids 161 and 164. Retraction of the armatures also results in actuation of the lever 158 to operate the bell-cranks 157 carrying the bars 156. The latter are thus withdrawn into the frame and the diaphragm or closure element 154 is freed from the edge of the door panel 150 so that the latter may be opened without frictional drag by the sealing element.

It will be apparent that after the user of the door has passed through the beam of light, the cell 171 will be energized to energize the solenoid 173. Such energization of course causes the arm 175 to be retracted from the point 179 and would normally result in opening of the circuit of the solenoids 161 and 164. Such opening of the circuit before the door 150 has returned to its closed position would be objectionable because it would result in the actuation of the bars 156 by the springs 162 and 166, to force the sealing element or diaphragm 154 outwardly into such position that it would constitute a barrier to the complete closure of the door.

In order to obviate this difficulty a holding circuit may be provided. Such circuit includes a switch arm 187 which is pivoted intermediate of its length upon a bracket 188 carried by the housing 152. One extremity of the switch arm carries a contact element 189 designed to ride upon the face of a shoulder 191 upon the pintle 151. This shoulder is provided with a notch 192 designed to receive the contact element when the door is in closed position. The opposite extremity of arm 187 is provided with a plunger 193 designed to bridge the gap between contacts 194 in a line 196, which in effect constitutes a bypass for the relay 174. In the operation of the door, it will be apparent that so long as the door is open or partially open the contact element 189 will ride upon the shoulder 191, and the plunger 193 will be depressed to close the circuit between the contact elements 194. The relay 174 will thus be by-passed and the solenoids 161 and 163 will be energized to retain the bars 156 in retracted position even though the user of the door has passed completely through the beam of light from the source 170. However, when the door has completely closed the contact point 189 will drop into the notch 192 and the plunger 193 will rise and thus open the circuit of the by-pass line 196 completely to deenergize the solenoids. So long as they are deenergized the springs 162 and 166 will actuate the plungers 159 and 163 to maintain the bars 156 against the inner face of the strip 154, and will continue so to do until the beam of light upon the photoelectric cell is again interrupted.

The forms of the invention herein shown and described are to be considered merely as illustrative of the invention. It will be apparent to those skilled in the art that numerous modifications may be made therein without departure from the spirit of the invention or the scope of the appended claims.

What I claim is:

1. The combination of a door frame, a door mounted to swing upon a pintle in the frame, said frame having a channel formed therein, in proximity to an edge of the door, a sealing bar disposed in the channel, means to project the bar laterally toward the edge of the door and to retract it therefrom, a cam carried by the door and being disposed in concentric relation with respect to said pintle, a follower carried by the door frame and engaging the cam and means operatively interconnecting the follower and the first-mentioned means, whereby upon opening of the door the bar is retracted from the edge of the door and upon closing of the door the bar is again projected into proximity to said edge.

2. The combination of a door frame, a door mounted to swing on a pintle in said frame, said frame having a channel formed therein in proximity to an edge of the door, a sealing bar disposed in the channel, means to project the bar laterally toward the edge of the door and to retract it therefrom, and comprising parallel levers pivoted in the channel and carrying the bar, a cam carried by the door and being disposed in concentric relation with respect to said pintle, a follower carried by the door frame and engaging the cam and means interconnecting the follower and the parallel levers comprising a bar pivoted to the levers, whereby upon opening of the door the bar is retracted from the edge of the door and upon closing of the door the bar is again projected into proximity to said edge.

3. The combination of a door frame, a door mounted to swing upon a pintle in said frame, a channel formed in the frame, a sealing bar disposed in the channel, a surface carried by the door and disposed to move concentrically with respect to said pintle, a follower secured to the frame and engaging the surface, said surface having an irregularity formed therein and designed to operate the follower, electrical means in the frame for operating the bar and switch means in circuit with the electrical means and actuated by the follower for controlling the electrical means when the door is opened or closed.

4. A construction as defined in claim 3 in which the electrical circuit further includes a relay switch and means for operating the relay switch comprising a photoelectric cell and a source of light so disposed that when the user of the door intercepts light the relay will be operated to cause retraction of the bar before the door is moved.

5. The combination of a door frame, a door mounted to swing in the frame upon a pintle disposed contiguous to an edge thereof, said frame having a channel formed therein, a bar disposed in the channel and being carried upon movable parts of expansible and contractible pressure chambers carried by the frame, the door having secured thereupon a cam element disposed in concentric relation with respect to said pintle, a follower engaging the cam and being connected to an expansible and contractible pressure chamber filled with a fluid medium and conduit means interconnecting the latter chamber with the first chambers, whereby upon opening or closing of the door fluid is injected into or withdrawn from the pitsons, in order to extend or retract the bar from proximity to the edge of the door.

WILLIAM OWEN.